United States Patent
Williams et al.

(10) Patent No.: US 8,120,395 B2
(45) Date of Patent: Feb. 21, 2012

(54) USE OF DATA DECISIONS FOR TEMPORAL PLACEMENT OF SAMPLERS

(75) Inventors: Richard G. C. Williams, Northampton (GB); Giuseppe Surace, Northampton (GB)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/885,302

(22) Filed: Sep. 17, 2010

(65) Prior Publication Data

US 2011/0068840 A1    Mar. 24, 2011

(51) Int. Cl.
*H03L 7/06* (2006.01)
(52) U.S. Cl. .................................. 327/156; 327/147
(58) Field of Classification Search .................. 327/147, 327/156
See application file for complete search history.

(56) References Cited

U.S. PATENT DOCUMENTS

| | | | | |
|---|---|---|---|---|
| 6,990,122 B2 * | 1/2006 | Guinea et al. | ................. | 370/518 |
| 7,315,596 B2 * | 1/2008 | Payne et al. | ................... | 375/355 |
| 7,587,012 B2 * | 9/2009 | Evans et al. | ................... | 375/354 |
| 7,849,374 B1 * | 12/2010 | Necoechea et al. | ........... | 714/724 |
| 8,036,300 B2 * | 10/2011 | Evans et al. | ................... | 375/276 |
| 2005/0238093 A1 * | 10/2005 | Payne et al. | ................... | 375/224 |
| 2007/0064837 A1 * | 3/2007 | Meltzer | ........................ | 375/327 |
| 2011/0068840 A1 * | 3/2011 | Williams et al. | .............. | 327/156 |
| 2011/0096884 A1 * | 4/2011 | Chatwin | ....................... | 375/360 |
| 2011/0249522 A1 * | 10/2011 | Welker et al. | ................. | 365/194 |

* cited by examiner

*Primary Examiner* — Lincoln Donovan
*Assistant Examiner* — Adam Houston
(74) *Attorney, Agent, or Firm* — John R. Pessetto; W. James Brady; Frederick J. Telecky, Jr.

(57) ABSTRACT

A data receiver has a clock recovery and data sampling circuit. This has a fixed local oscillator for timing the data samples. A phase interpolator adjusts the phase of the clock signal in response to an early late detector which samples the waveform at the expected position of the edges. A further correction to the sampling position is made in response to the recent history of the data received. The correction is modelled on predictable jitter, for example, that in a transmitter caused by changes in data causing the supply voltage to drop.

17 Claims, 8 Drawing Sheets

USE OF DATA DECISIONS FOR TEMPORAL PLACEMENT OF SAMPLERS

This application claims priority to Application No. GB 0916341.1 filed Sep. 18, 2009. The present invention relates to the sampling of a waveform where the timing of, or clock for, the sampling is recovered from the waveform.

This problem is found in many situations, including in a SerDes or serialzier/deserializer.

As the data rates for SerDes increase, the amount of time in which to sample the incoming waveform to enable data to be accurately recovered is reduced. Until now the amount of time was tolerable as long as good design practices were followed. However, as we look to data rates of 20 Gbps using dual level signalling techniques (such as NRZ) the time window (commonly known as the horizontal eye opening—after the plot of the waveform where a series of bits from the waveform are superposed, with different bits providing different traces due to inter-symbol interference) to effect sampling has a maximum value of only 50 ps.

The difficulty in sampling in the right place is that the edges of the eye jitter, so a sampling point for the data near the centre of the eye must be found (in order to avoid sampling the data near the edge, which is unreliable). However, as the maximum eye opening decreases it is becoming clear, the inventors have realised, that there will soon be a time when there is no point in the eye that will be consistently clean.

Inter-symbol interference (ISI) caused by the transmission channel is a recognized problem and has been addressed in manner described in a previous patent, GB2423902, the proprietor of which is also Texas Instruments. In the method of that patent patterns in the data received are used to control the amount of equalization provided by an analogue equalizer in the receiver. In more recent circuits, the slicing or decision level used to decide whether a sample taken in the receiver is a 1 or a 0 is set again in response to patterns in the data received. The slicing level is set by a circuit called a Decision Feedback Equalizer (DFE).

The present invention takes a different approach to positioning the sampler, which is deployed in addition to the general tracking of clock drift and is suitable to tackle a particular small source of jitter in the edges of the received waveform. This contributing factor to the problem of the narrowing eye is generated in the transmitter. Here the delay in clock pulses arriving at the data generation circuits in the transmitter is dependent on the data pattern being transmitted, due to the effects the data generation circuits have on the power supply coupling back to the clock circuit. This effect is becoming a significant contributor to the jitter on the eye, at the data rates mentioned above and over short distances of a few centimeters.

Existing techniques to minimize this problem at the transmitter are expensive in terms of implementation. The level of high probability deterministic jitter (Dj) is mainly caused by the variation of the power supply impacting the clock timing path. To minimise this variation a robust power supply capable of generating low, say 30 mV or less of supply ripple, is required. Separation of power supplies for clock and data is already done as much as practically possible to take 'low frequency' digital circuitry noise out of the clock path. Further techniques available to minimise power supply movement rely on increased supply decoupling capacitance and also use of supply regulators. These techniques significantly increase the silicon area required for the transmitter and lead to more costly implementations.

However, and in accordance with the invention it is possible to combat the effect at the receiver.

According to the present invention there is provided a data sampling and clock recovery circuit comprising:
an input for a data waveform;
a data sampler connected to receive and sample the data waveform to provide samples of the data contained therein;
a clock generator connected to the data sampler to provide a clock signal setting the times at which data samples are taken by the data sampler; and
a phase detector responsive to information about the phase difference between data waveform and the clock signal to provide an indication of that difference, the clock generator being responsive to that indication to adjust the phase of the clock signal;
the circuit further comprising:
a data sample analyser connected to receive the data samples from the data sampler and to produce therefrom an additional clock adjustment signal, the circuit being arranged to provide a data sample having a sampling phase selected in response to the additional clock adjustment signal.

The clock generator may be responsive to the additional clock adjustment signal to adjust the phase of the clock signal provided to the data sampler.

The clock generator may comprise an additional adjustment phase interpolator connected to receive a clock signal and to produce therefrom a plurality of phases and to select therefrom one of those in response to the additional clock adjustment signal and to provided the selected one to the data sampler.

The additional adjustment phase interpolator may comprise a delay line connected to receive the said clock signal and to produce therefrom the plurality of phases and a multiplexer connected to select the said one of those phases in response to the additional clock adjustment signal.

The data sampler may comprise a plurality of data samplers connected in parallel to sample the data waveform, and the clock generator may be connected to provide respective clock phases to set the respective sampling times of the plurality of data samplers, the additional clock adjustment signal being connected to select which data sampler provides the data sample output by the data sampling and clock recovery circuit.

The data sample analyser may be responsive to patterns in the data samples.

The data sample analyser may be responsive to a plurality of recent data bits sampled by the data sampler. Further, the data sample analyser may be responsive to a plurality of data bits sampled by the data sampler including the most recent data sample produced by the data sampler.

The data sample analyser may be operative to produce the additional clock adjustment signal so that it is indicative of delays in timing of edges in a waveform produced by drops in a power supply produced by changes in the data being transmitted.

The clock generator may comprise a fixed local oscillator and a phase interpolator connected to derive therefrom a phase of a clock signal. Further the phase interpolator may be connected to select the phase of the clock signal in response to the indication provided by the phase detector.

The data sample analyser may comprise a lookup table.

The present invention also provides a method of sampling a data waveform and recovering a clock signal therefrom, comprising:
generating a local clock signal,
sampling the data contained in the waveform at times defined by that clock signal to produce data samples;

detecting the phase difference between data waveform and the local clock signal and in response to that adjusting the phase of the local clock signal; and producing a correction signal in response to the data samples and making in response to that a selection of the phase of the clock signal used to provide the data sample output by the method.

The correction signal may be applied to adjust the phase of the clock signal used to sample the data waveform to produce data samples.

Alternatively the method may further comprise:

generating a plurality of phases of the local clock signal, and providing a plurality of samplers connected to sample the waveform in parallel, each receiving a respective one of the local clock phases, wherein the correction signal is applied to select which data sampler produces the data sample output by the method.

The production of the correction signal may be predictive of a process that temporally displaces data transitions in the waveform in a manner correlated the pattern of data values transmitted.

The present invention further provides a clock recovery circuit comprising:

an input for a data waveform, a first latch connected to the input to sample the waveform, at least one second latch connected to the input to sample the waveform, a local oscillator connected to provide respective phases of a clock signal to the first latch and the or each of the second latches to determine the times at which the first and at least second latches sample the data waveform, a data pattern analyser connected to receive the data samples taken by the second latch, or the output of a selected one of the second latches, to produce a signal connected to select the phase of the clock signal used to sample the data received by the data pattern analyser, a phase detector connected to receive samples from the first and the at least one second latches to provide a phase or frequency adjustment signal to the local oscillator.

In the prior art items cited above equalizers and decision feedback equalizers were used to open the vertical eye opening when the system had closed the eye vertically. In the present invention, knowledge of the data pattern received is used to place the samplers in the eye temporally to open the horizontal eye. Indeed, in some arrangements the same data decision information can be fed into both the vertical (signal level) and horizontal (temporal) eye opening circuits.

The disclosure of GB2423902 is incorporated herein by reference.

Examples of the invention will now be described, with reference to the accompanying drawings, of which.

Figure 1:
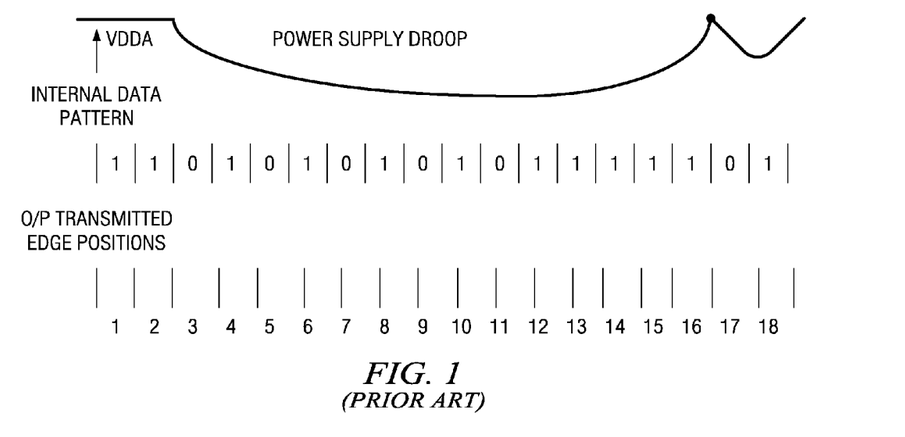
FIG. 1 illustrates the generation of jitter in the transmitter.

Details of the jitter problem generated by the transmitter are illustrated by FIG. 1. In FIG. 1 the second line shows the data patterns being transmitted. When the data level changes frequently more current is drawn by the data generation or line driver circuits causing the voltage level of the power supply in the transmitter circuits to drop. The magnitude of the drop depends on the history of the data pattern—a longer period of a changing data pattern will cause more of a drop than a shorter period, and for an extended period of changing data pattern the power supply will approach a minimum level. For constant, unchanging, data the power supply level recovers towards a maximum level. The greatest change is on the first transition after a period of constant data. These features can be seen in the first trace of FIG. 1, which is the voltage level of the power supply.

Figure 1A:
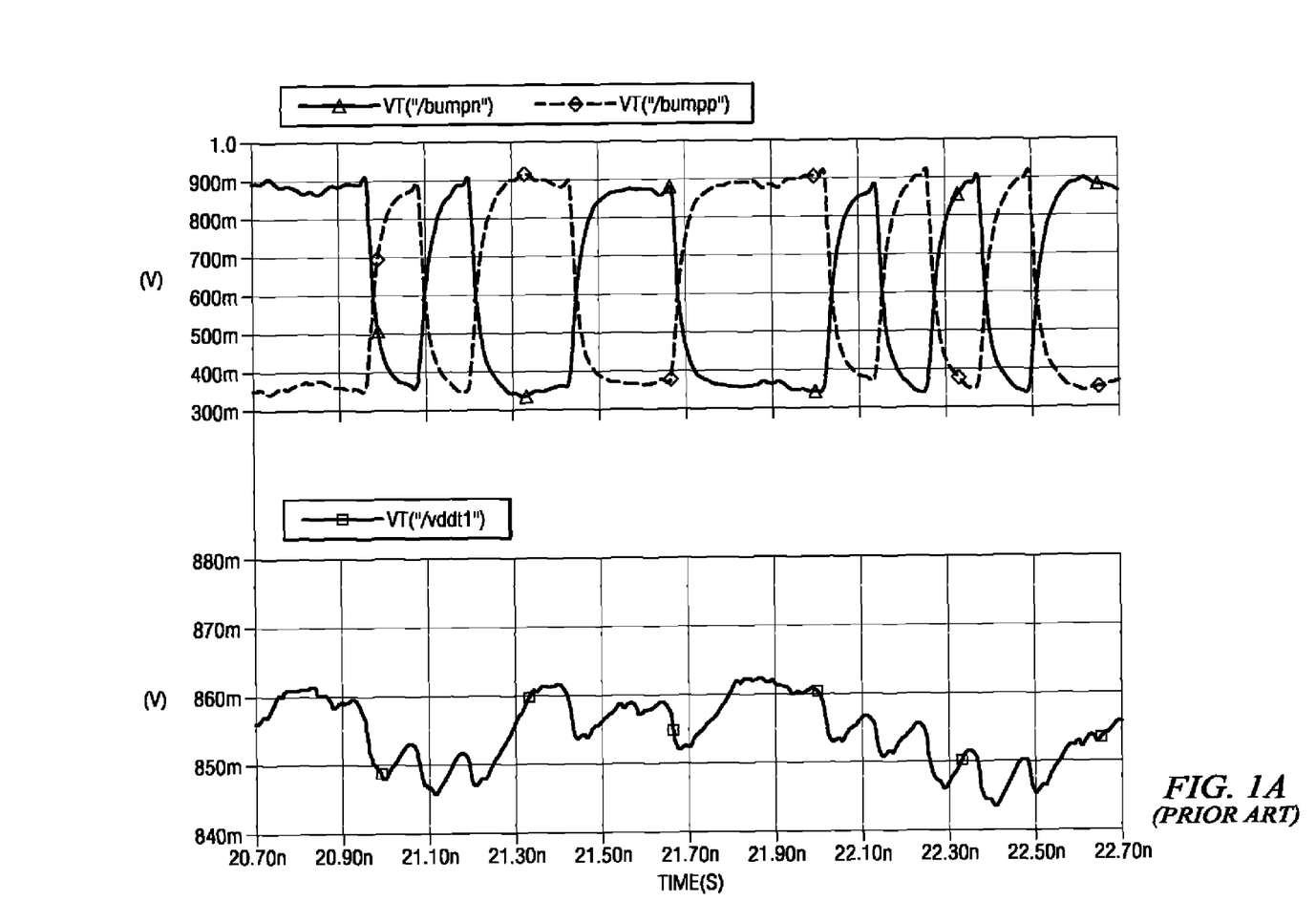
FIG. 1A shows measurements of jitter in the transmitter.

Now, in the transmitter, the clock circuit provides the clock input to the line drivers, thereby timing the transitions between the data bits transmitted, and both these circuits draw their current from the same power supply. The edges in the clock signals from the clock circuit are delayed by an amount dependent on the drop in the power supply level, which in turn, as explained above, is dependent on the pattern of data transmitted recently. So, during a period of constant power supply level the data transmitted will have a constant, and the intended, bit period, and if the power supply drops the edges will move later in the cycle but if it recovers they will occur earlier. These effects can be seen in the third line in FIG. 1, which shows the positions of data transitions between bits. Actual edges occur in the waveform if the data changes from 0 to 1 or 1 to 0. In a typical example, the power supply of 870 mV can drop to 840 mV causing a delay in the edges in the transmitted data waveform of 6 ps, which at a data rate of 20 Gbps, or a bit period of 50 ps, is significant. FIG. 1A shows a measured power supply level in a transmitter (lower trace) and the corresponding jitter (upper trace) in the transmitted waveform.

While the above describes a detailed mechanism by which jitter is generated in the transmitter, the present invention is not limited to jitter generated by that particular mechanism (nor indeed to jitter generated in the transmitter) but it is suitable for other sources where the jitter, depends on the pattern of the data transmitted.

Figure 2:
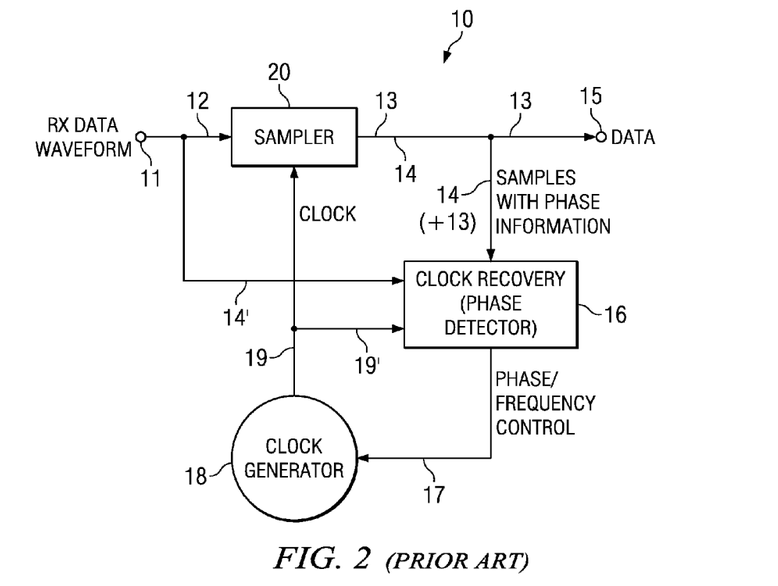
FIG. 2 is a high level block diagram of a typical known data sampling and clock recovery circuit.

FIG. 2 is a high level block diagram of a typical data sampling and clock recovery circuit 10 used in a receiver as is known in the art. A data waveform 12 received on a terminal 11 is sampled by sampler 20. The sampler 20 takes samples of the waveform 12 at times indicated by a clock signal generated by clock generator 18. The objective is for the sampler to sample the data at times away from the edges of the data waveform, ideally half way between them, to produce data samples 13, which are output as the recovered data on terminal 15. Clock generator 18 is controlled by a clock recovery circuit 16 to keep the sampling point near the ideal position. It produces a control signal 17 which controls the phase, or equivalently the frequency, of the clock signal 19 produced by the clock generator 18. Traditionally this would have been done, by comparing the positions of the edges of the data waveform 14 and those of the clock signal 19 by making that comparison directly from those signals, as illustrated by connections 14' and 19' and making adjustments to the phase/frequency of the clock signal to reduce the difference. Such an arrangement is termed a phase locked loop (PLL). The arrangement keeps the local clock signal in phase with the data waveform in the presence of low-frequency jitter.

Figure 3:
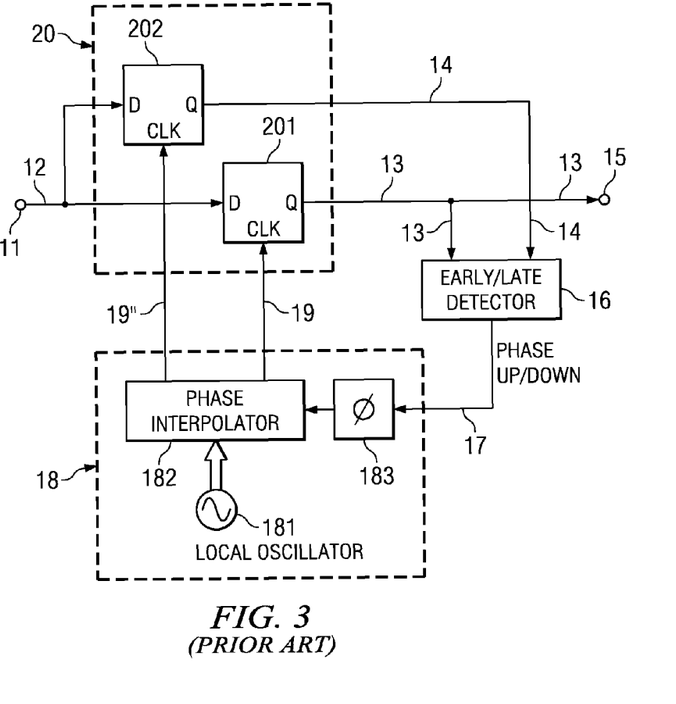
FIG. 3 is a lower level block diagram of an example of the circuit of FIG. 2.

However, as is also known in the art, it is also possible to obtain information on the relative phases of the clock signal and the data waveform 12 from samples 14 taken at or near the data transitions in the data waveform. One example of such a circuit is shown in FIG. 3 and includes generally the relevant parts of the circuit from GB2423902, cited above. FIG. 3 has the same reference numerals for the same circuit blocks and signals as is used in FIG. 2. The circuit of FIG. 3 comprises a data sampling latch 201 connected to sample the received data waveform at times, away from the edges in the data waveform—in fact half way between the points at which the edges occur, defined by one phase of the clock signal 19 produced by the clock generator 18.

A second latch 202 is provided to sample the data waveform at the expected points of the edges in the data waveform and is controlled by a second phase of the clock signal 19". The samples 14 produced this latch are used by an early/late detector 16 together with the context of the preceding data sample and the following data sample produced by the data latch 201. The early/late detector first decides from the preceding and following data samples being different or not whether there is an edge present to be considered. If there is it compares the edge sample with the following data sample and if they are the same it signals 17 that the phase of (of each phase of) the clock signal should be brought forward (advanced), because the edge sample has been taken after the actual edge, and signals 17 that it should be delayed (retarded) if they are different. Typically early late detector accumulates such indications from 16 or 32 or 64 of the most recent samples and then makes the signal 17 on the basis of whether the majority of them indicate that the clock signal should be delayed or retarded by an increment of 1/32 of a bit period (which at the data rate of 20 Gbps mentioned above is 1.56 ps).

In this circuit the clock generator 18 is implemented with a fixed frequency local oscillator 181, which provides a plurality of clock phases, and a phase interpolator 182 connected to select as its output a particular one of those phases, or a phase interpolated between two of them, under the control of a phase selector 183. The phase selector 183 stores a phase value and adjusts it up or down in response to the output of the early/late phase detector 16. Existing high speed interpolators take about 1.5 ns to settle to the new phase, which is about 30 bit periods at 20 Gbps.

Figure 4:
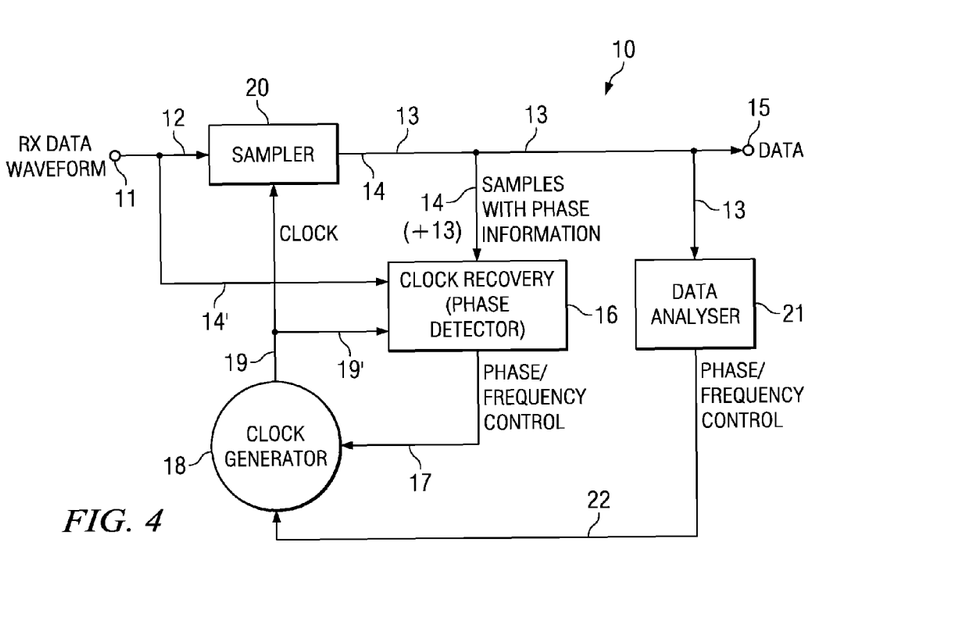
FIG. 4 is a block diagram of a first example of the invention.

FIG. 4 is a block diagram of an example of a circuit in accordance with the invention. Overall this is similar to the known circuit of FIG. 2 having a sampler 20 connected to receive the incoming data waveform 12 on terminal 11. Again, the local clock generator 18 aims to sample the waveform to produce data by sampling at points away from the edges in the data waveform. Again, a clock recovery circuit 16 monitors the phase difference between the data waveform and the local clock signal 19 and controls the clock generator 18 to reduce or eliminate that difference. (Again, the detection of the phase difference can be implemented in any of the ways discussed above with respect to FIG. 2 or FIG. 3 or indeed any other way.) This adjustment of the phase of the local clock signal copes with jitter that affects the positions of the edges in the data waveform over a long period (for example 64 bit periods or more) as well as tracking any frequency drift between the transmit and receive clocks if they are not synchronous. Jitter caused by the transmission channel usually falls into this category. However, it does not cope with shorter term variations that are caused by the power supply feedback effect in the transmitter that was described above with respect to FIG. 1, which are much faster.

To address that problem, the circuit of FIG. 4 has an additional adjustment to the clock phase provided by a data sample analyser 21. This analyses recent data samples (i.e. those 13 taken away from the edges rather than those 14, if any, taken near the edges for the purposes of the clock recovery circuit 16) detecting the pattern of the data in those samples changes, and in response to that pattern provides a further adjustment signal 22, which is applied to the clock generator to cause a further adjustment in the phase of the local clock. The size and/or direction of this adjustment is selected to counteract the transmitter power supply effect described with respect to FIG. 1. More, particularly the data sample analyser may look for particular patterns in data that indicate the level of power supply drop, for example patterns with more change provide more drop.

Figure 5:
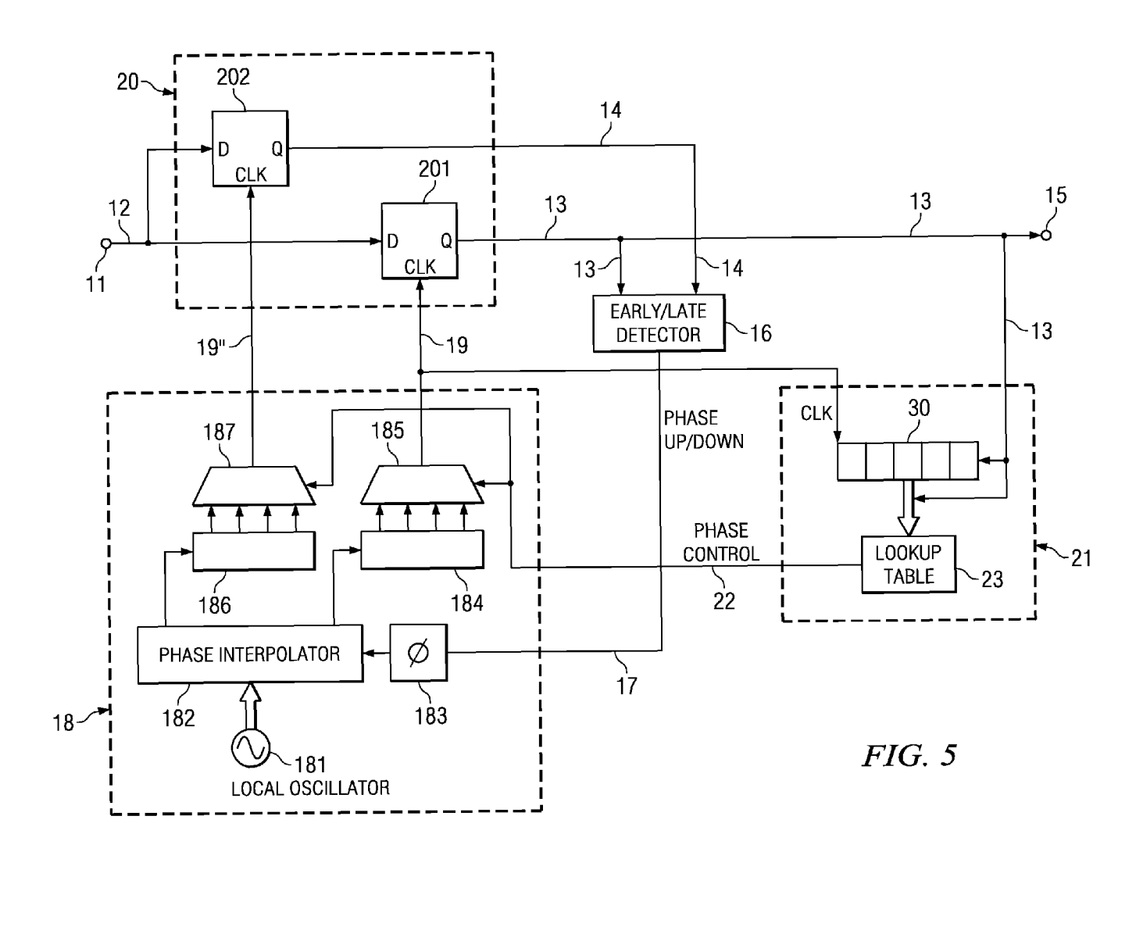
FIG. 5 is a lower level block diagram of an example of the circuit of FIG. 4.

FIG. 5 shows a more detailed version of the circuit of FIG. 4. This example shows a first example of the data sample analyser 21. Consecutive recent samples of the data 13 are stored for analysis in shift register 30 (shifted in response to clock 19). These, and the most recent sample stored in latch 201, are applied in parallel to a look-up table 23, as a key or address, to provide a suitable correcting phase value 22, for that particular data pattern, as the additional phase/frequency control signal 22 to the clock generator 18. The lookup table includes a correction value for each possible data pattern in the shift register.

The value of the correction can be determined experimentally, or by modelling in circuit simulation software. The experiment would comprise receiving repeated test patterns with the circuit, varying the temporal sampling position manually by providing values for the additional phase control signal 22 and noting the positions that cause the least data errors.

FIG. 5 also shows examples of the details of the clock generator 18 and sampler 20. These are generally as shown in FIG. 3 but the clock generator has an additional component, which is a second stage phase interpolator comprising a delay line 184 and a multiplexer, which together make an additional phase adjustment to the clock signal in response to the phase control signal 22 provided by data sample analyser 21 before it is applied to the sampling latch 201. The delay line 184 receives the output of phase interpolator 182 and produces a plurality of phase positions covering a range of phases, over for example 18 ps giving a range of adjustment of +/−9 ps, which generally will be enough to cover the adjustment needed to compensate for the effect in the transmitter described in relation to FIG. 1: The number of phase positions determines the accuracy of the adjustment, with +/−6 positions being sufficient typically. The multiplexer 185 receives the output 22 of the data sample analyser 21 and in response selects the indicated one of those phases, which selected one is then applied to the data sampling latch 201. As noted, generally is not needed to cover 360 degrees of phases with the second phase interpolator.

(A second stage interpolator is similarly constructed from delay line 186 and multiplexer 187 to apply the same correction determined by the data sample analyser 21 to the second phase 19" which controls the edge sampling latch 202. Since the effect of this latch is in the slow early/late loop, this second stage interpolator may not be needed and may therefore be omitted (or be replaced by a delay line providing to the second clock phase 19" a delay of half the maximum delay of the delay line 184).)

The phase 19, and possibly also 19", selected for sampling are each therefore a combination of the phase inferred from the from monitoring the edges with early/late detector 16 and a predicted correction provided by the data sample analyser 21, which compensates for the faster variation in the edge position caused by the power supply feedback problem in the transmitter noted above. (It may also be noted that this arrangement would be suitable to deal with other sources of variation in the edge position that can be predicted from recent data samples.)

The feedback loop provided by the clock recovery circuit 16 (e.g. the early late detector 16) does not respond to rapid variations in the edge position but averages, for various reasons as are known in the art of phase locked loops. In any event making a phase locked loop respond more quickly would only provide an average of recent edges—it would not predict the change in position of the next edge, which is what is achieved by the data sample analyser 21.

It was noted earlier that the data transition delay caused by the power supply coupling effect in the transmitter is dependent on the history of data bits, with the more recent history being more significant. In the data sample analyser 21 of FIG. 5 having a longer shift register 30 would increase accuracy in the prediction. This however has to be balanced against the size of the look up table, which has $2^n$ entries, where n is the length of the shift register. Depending on the transmitter architecture, n would typically be in the range 4 to 8. However n=1 could provide benefit.

Figure 6:
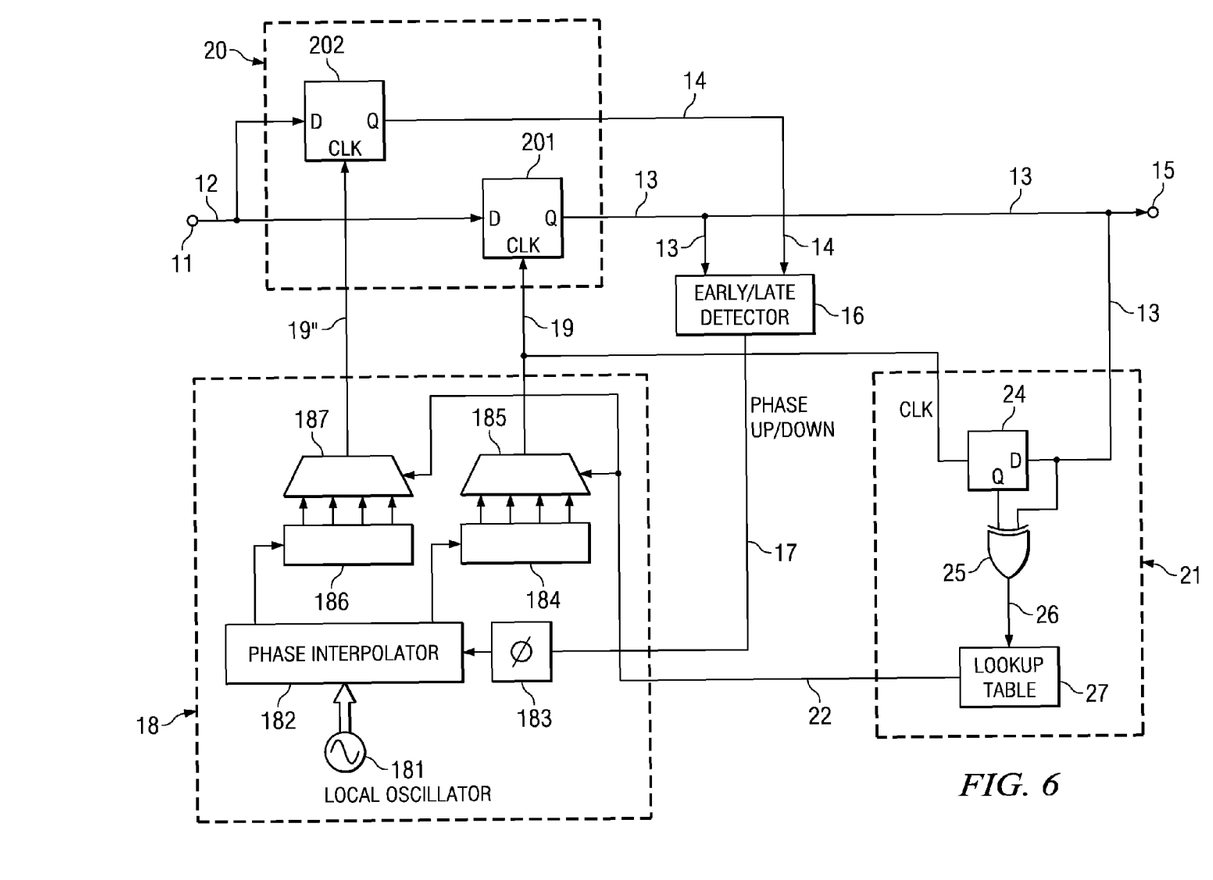
FIG. 6 is a lower level block diagram of an example of the circuit of FIG. 4 having a different data sample analyser.

FIG. 6 shows a different example of the data sample analyser 21. In this example the change in the data is monitored. A latch 24 is provided holding the previous one of the data samples 13. This sample and the current sample from latch 201 are connected in parallel to an exclusive-OR gate 25, whose output is therefore 1 if there is a change in the data and 0 if there is not. This output is used to determine whether a correction is applied to the phase selected by 183 or not. The output of 25 is converted by a lookup table 27 into an appropriate value for the phase correction signal 22, which is then applied to select the phase of the clock signal in the same manner as described above. So this particular lookup table has only two entries, one of which may be zero, but having two non-zero entries is not precluded. If greater accuracy in positioning the data sampling point is desired the output of the exclusive OR-gate can be fed into a shift register, which therefore stores the pattern of change over recent bits, and that data may then be output in parallel to the lookup table 27 as the address or key.

The time allowed to position in time the data sampler 201 is constrained by the need to sample in a position determined by the most recently received data bit, which generally provides a large contribution to the correction. At very high speeds the most recently received bit may not be yet available. Longer for the adjustment to the sampling phase can be allowed by making it speculatively. In this case more than one sampler 201 is provided, each having a different temporal sampling position. When the most recent data sample 13 and the correction signal 22 from the data analyser 21, which depends upon it, become available, the data sample from the data sampler that used the phase indicated by the correction signal is selected.

Figure 7:
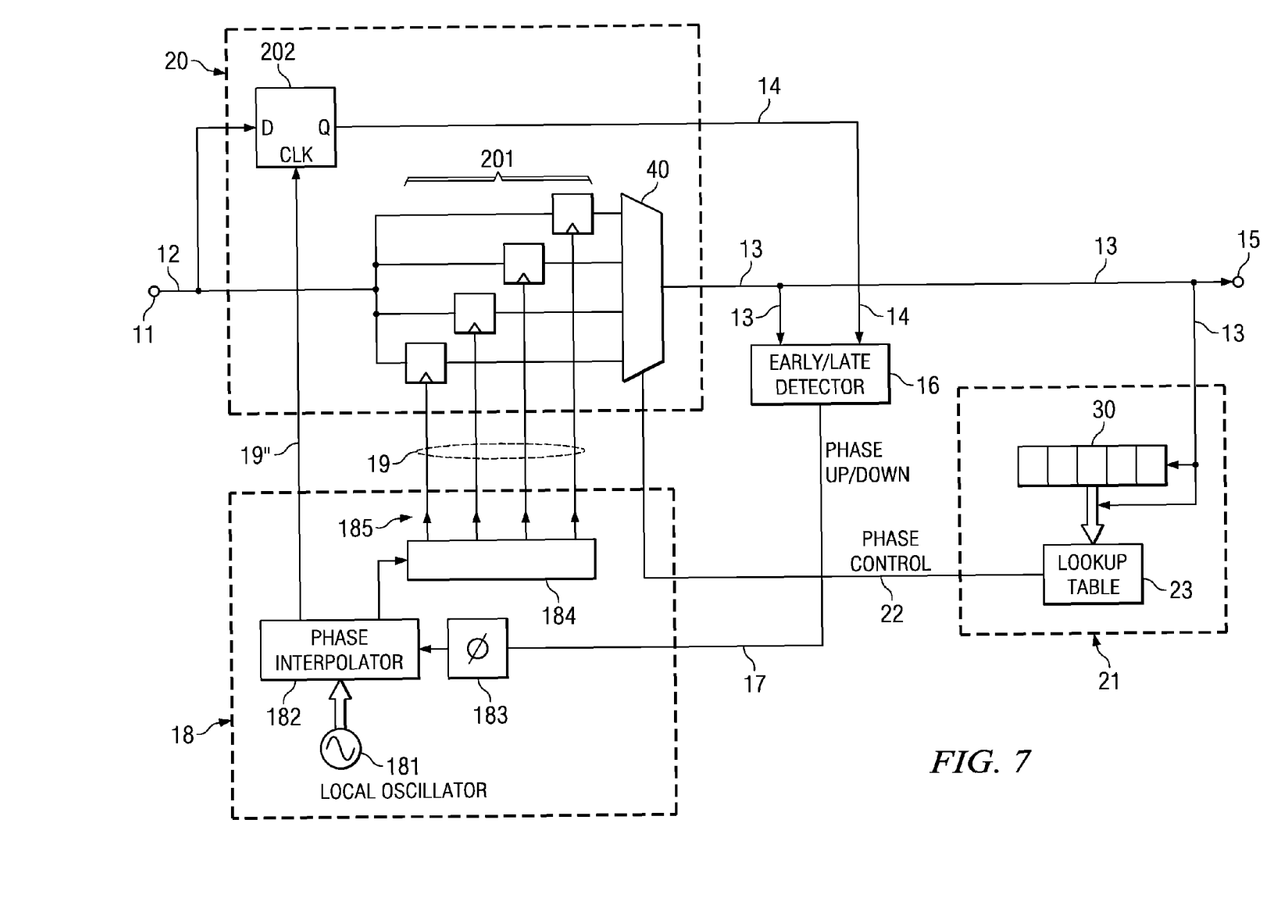
FIG. 7 is a first example of the invention allowing for late production of the current data sample.

FIG. 7 shows an example circuit for that, although otherwise the circuit is generally as in FIG. 5. A plurality of data latches each receives a different phase from delay line 184. The phase control signal 22 however is applied to the select input of a multiplexer 40 connected to select between the outputs of the data sampling latches.

Note that it may be possible in some cases for the multiplexer 40 to make a selection between some groups of the latches on the basis of one or more of the previous data samples and do that before the most recent sample becomes available.

Figure 8:
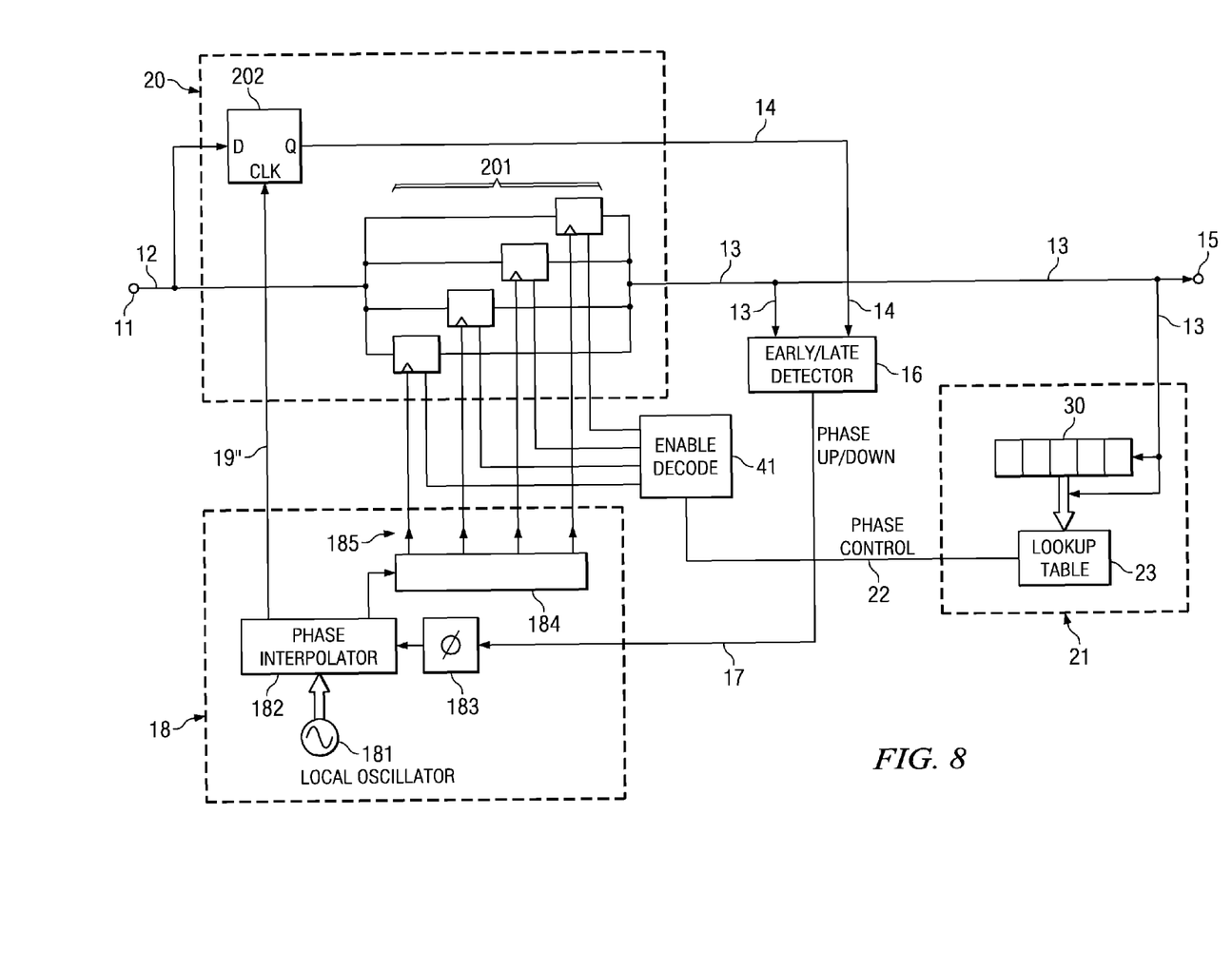
FIG. 8 is a second example of the invention allowing for late production of the current data sample.

In a slightly different example in FIG. 8, each data sampling latch 201 has an enable input to select which of the data sampling latches, which are again supplied with their respective clock phases, should take the sample. Enable decode 41 converts the code 22 output by the data analyser 21 to a one of many signal, which enables the selected latch 201.

Figure 9:
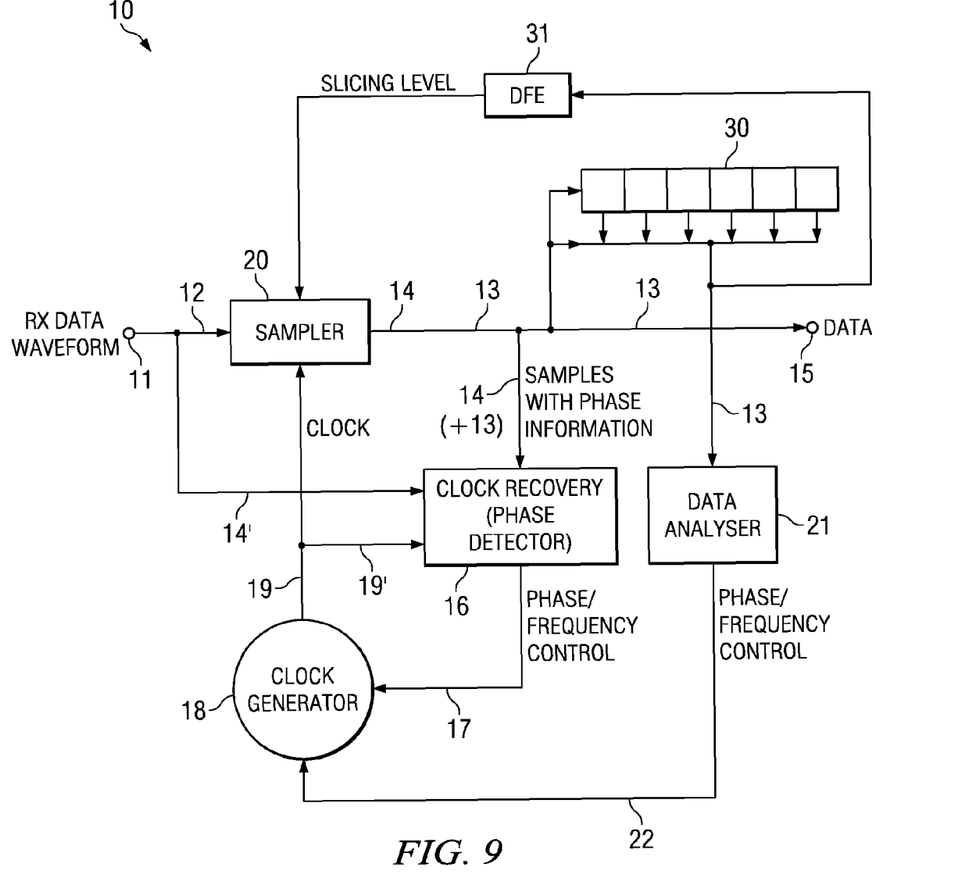
FIG. 9 is an example of the invention incorporating a decision feedback equalizer.

FIG. 9 shows a block diagram of an example of the invention showing the incorporation of an equalizer to compensate for, for example, the effects of channel low pass filtering. This is similar to FIG. 4, and uses similar reference numerals for similar parts. In the manner of known circuits as discussed above, the Decision Feedback Equalizer (DFE) 31 adapts in response to the data received 13 to provide a effective compensating equalization to the received data waveform 12, by setting the slicing level of sampler 20. Shift register 30 records the recent data samples 13. These samples are used both by the data analyser 21 and the equalizer 31; so the shift register 30 is shared by those.

In the examples noted above the effects of changes between consecutive data samples have been taken into account. However there may also be cases where jitter may be generated in data transition positions where the noise is dependent on change between samples further apart. For example if the jitter due to change is generated in each of k parallel waveforms which are then multiplexed, the samples whose change caused the noise are k samples apart in the multiplexed signal. Accordingly the data sample analyzer would analyze the data patterns received to be responsive especially to samples k samples apart.

What is claimed:

1. A data sampling and clock recovery circuit comprising:
   an input for a data waveform;
   a data sampler connected to receive and sample the data waveform to provide samples of the data contained therein;
   a clock generator connected to the data sampler to provide a clock signal setting the times at which data samples are taken by the data sampler; and
   a phase detector responsive to information about the phase difference between data waveform and the clock signal to provide an indication of that difference, the clock generator being responsive to that indication to adjust the phase of the clock signal;
   the circuit further comprising:
   a data sample analyser connected to receive the data samples from the data sampler and to produce therefrom an additional clock adjustment signal, the circuit being arranged to provide a data sample having a sampling phase selected in response to the additional clock adjustment signal.

2. A data sampling and clock recovery circuit as claimed in claim 1 wherein the clock generator is responsive to the additional clock adjustment signal to adjust the phase of the clock signal provided to the data sampler.

3. A data sampling and clock recovery circuit as claimed in claim 2 wherein the clock generator comprises an additional adjustment phase interpolator connected to receive a clock signal and to produce therefrom a plurality of phases and to select therefrom one of those in response to the additional clock adjustment signal and to provided the selected one to the data sampler.

4. A data sampling and clock recovery circuit as claimed in claim 3 wherein the additional adjustment phase interpolator comprises a delay line connected to receive the said clock signal and to produce therefrom the plurality of phases and a multiplexer connected to select the said one of those phases in response to the additional clock adjustment signal.

5. A data sampling and clock recovery circuit as claimed in claim 1 wherein
the data sampler comprises a plurality of data samplers connected in parallel to sample the data waveform, and
the clock generator is connected to provide respective clock phases to set the respective sampling times of the plurality of data samplers, the additional clock adjustment signal being connected to select which data sampler provides the data sample output by the data sampling and clock recovery circuit.

6. A data sampling and clock recovery circuit as claimed in claim 1 wherein the data sample analyser is responsive to patterns in the data samples.

7. A data sampling and clock recovery circuit as claimed in claim 1 wherein the data sample analyser is responsive to a plurality of recent data bits sampled by the data sampler.

8. A data sampling and clock recovery circuit as claimed in claim 7 wherein the data sample analyser is responsive to a plurality of data bits sampled by the data sampler including the most recent data sample produced by the data sampler.

9. A data sampling and clock recovery circuit as claimed in claim 1 wherein the data sample analyser is operative to produce the additional clock adjustment signal so that it is indicative of delays in timing of edges in a waveform produced by drops in a power supply produced by changes in the data being transmitted.

10. A data sampling and clock recovery circuit as claimed in claim 1 wherein the clock generator comprises a fixed local oscillator and a phase interpolator connected to derive therefrom a phase of a clock signal.

11. A data sampling and clock recovery circuit as claimed in claim 10 wherein the phase interpolator is connected to select the phase of the clock signal in response to the indication provided by the phase detector.

12. A data sampling and clock recovery circuit as claimed in claim 1 wherein the data sample analyser comprises a lookup table.

13. A method of sampling a data waveform and recovering a clock signal therefrom, comprising:
generating a local clock signal,
sampling the data contained in the waveform at times defined by that clock signal to produce data samples;
detecting the phase difference between data waveform and the local clock signal and in response to that adjusting the phase of the local clock signal; and
producing a correction signal in response to the data samples and making in response to that a selection of the phase of the clock signal used to provide the data sample output by the method.

14. A method as claimed in claim 13 wherein the correction signal is applied to adjust the phase of the clock signal used to sample the data waveform to produce data samples.

15. A method as claimed in claim 13 comprising
generating a plurality of phases of the local clock signal, and
providing a plurality of samplers connected to sample the waveform in parallel, each receiving a respective one of the local clock phases,
wherein the correction signal is applied to select which data sampler produces the data sample output by the method.

16. A method of sampling as claimed in claim 13 wherein the production of a correction signal is predictive of a process that temporally displaces data transitions in the waveform in a manner correlated the pattern of data values transmitted.

17. A clock recovery circuit comprising:
an input for a data waveform,
a first latch connected to the input to sample the waveform,
at least one second latch connected to the input to sample the waveform,
a local oscillator connected to provide respective phases of a clock signal to the first latch and the or each of the second latches to determine the times at which the first and at least second latches sample the data waveform,
a data pattern analyser connected to receive the data samples taken by the second latch, or the output of a selected one of the second latches, to produce a signal connected to select the phase of the clock signal used to sample the data received by the data pattern analyser,
a phase detector connected to receive samples from the first and the at least one second latches to provide a phase or frequency adjustment signal to the local oscillator.

* * * * *